(12) United States Patent
Chiu et al.

(10) Patent No.: US 12,533,874 B2
(45) Date of Patent: Jan. 27, 2026

(54) AUTOMATED DISMANTLING AND SEPARATION SYSTEM FOR SOLAR PANELS

(71) Applicant: GLOTERN GREEN ENERGY CO., LTD., Taichung (TW)

(72) Inventors: Chih-Yu Chiu, Taichung (TW);
Rou-Xuan Chen, Taichung (TW);
Shih-Ying Cheng, Taichung (TW);
Chu-Hung Liu, Taichung (TW);
Hsiu-Huan Huang, Taichung (TW);
Tse-Yu Chiu, Taichung (TW)

( * ) Notice: Subject to any disclaimer, the term of this patent is extended or adjusted under 35 U.S.C. 154(b) by 211 days.

(21) Appl. No.: 18/611,866

(22) Filed: Mar. 21, 2024

(65) Prior Publication Data

US 2025/0178333 A1 Jun. 5, 2025

(30) Foreign Application Priority Data

Dec. 1, 2023 (TW) .................................. 112146724

(51) Int. Cl.
*B32B 43/00* (2006.01)
*H10F 71/00* (2025.01)

(52) U.S. Cl.
CPC .......... *B32B 43/006* (2013.01); *H10F 71/00* (2025.01); *Y10S 156/922* (2013.01); *Y10S 156/937* (2013.01); *Y10T 156/1153* (2015.01); *Y10T 156/1911* (2015.01)

(58) Field of Classification Search
CPC ............ B32B 43/006; Y10T 156/1153; Y10S 156/922; Y10S 156/937
See application file for complete search history.

(56) References Cited

U.S. PATENT DOCUMENTS

| | | | |
|---|---|---|---|
| 11,491,775 B1* | 11/2022 | Lee | H02S 40/34 |
| 11,845,239 B1* | 12/2023 | Fu | B32B 17/10678 |
| 2020/0247106 A1* | 8/2020 | Lee | H10F 19/80 |
| 2022/0140175 A1* | 5/2022 | Matsumoto | H10F 71/00 29/762 |
| 2023/0019898 A1* | 1/2023 | Lee | B65H 41/00 |
| 2023/0343654 A1* | 10/2023 | Ribeiro Dias | H02S 50/15 |

* cited by examiner

*Primary Examiner* — Philip C Tucker
*Assistant Examiner* — Nickolas R Harm
(74) *Attorney, Agent, or Firm* — Bruce Stone LLP; Joseph A. Bruce

(57) ABSTRACT

An automated dismantling and separation system for solar panels is provided, which mainly disassembles the aluminum frame of the solar panel to form the stack material through the frame disassembly system, and the stack material is transported by the handling device to the stack material disassembly system, and the stack material is heated through the heating unit to melt the EVA adhesive between the glass upper cover, wafer layer and backplane layer. Then the topmost material is removed through the suckers of the handling device to expose the residual adhesive, and the residual adhesive is scraped off by the scraper, so that each layer of material is repeatedly removed in sequence and collected and recycled respectively to achieve the purpose of high efficiency and environmental protection.

20 Claims, 18 Drawing Sheets

AUTOMATED DISMANTLING AND SEPARATION SYSTEM FOR SOLAR PANELS

BACKGROUND

Field of the Invention

The present invention relates to a dismantling device, and more particularly ton automated dismantling and separation system for solar panels.

Description of Related Art

Generally, a solar photovoltaic panel consists of sequentially stacked a glass top cover, a wafer layer, and a backplane, all of which have adhesive layers (such as EVA packaging materials) to combine the top cover, wafer layer, and backplane. The outer edges of the stacked materials are additionally equipped with aluminum frame, junction box, and other structures.

At present, the existing solar panel disassembly process mainly focuses on the processing of aluminum frame and junction box. The stack materials after dismantling the aluminum frames and junction boxes, such as glass covers, chip layers, and backboards, cannot be recycled in layers due to the adhesive layer between them, and can only be crushed and then entrusted to a third party for thermal cracking or other combustion process for follow-up treatment. This will lead to pollution problems, for which an efficient and environmentally friendly dismantling method is needed.

SUMMARY

The invention provides an automated dismantling and separation system for solar panels, with the main objective of providing an efficient and environmentally friendly dismantling method.

To achieve the above objective, an automated dismantling and separation system for solar panels in accordance with the present invention comprises:
- a frame disassembly system including a carrying platform, a plurality of linear transmission devices disposed to the carrying platform, and a clamp disposed to each of the linear transmission devices;
- a handling device provided for carrying solar panels or a stack material to move; and
- a stack material disassembly system including a disassembly platform, a heating and temperature control module, and a scraper module, wherein the heating and temperature control module includes at least one heating unit, at least one moving frame and at least one linear drive device, the at least one linear drive device drives the at least one moving frame to move, the at least one heating unit is disposed to the at least one moving frame, the scraper module includes a scraper and a linear transmission mechanism, and the scraper is disposed to and driven to move by the linear transmission mechanism From the above, it can be seen that the invention mainly disassembles the aluminum frame of the solar panel to form the stack material through the frame disassembly system, and the stack material is transported by the handling device to the stack material disassembly system, and the stack material is heated through the heating unit to melt the EVA adhesive between the glass upper cover, wafer layer and backplane layer. Then the topmost material is removed through the suckers of the handling device to expose the residual adhesive, and the residual adhesive is scraped off by the scraper, so that each layer of material is repeatedly removed in sequence and collected and recycled respectively to achieve the purpose of high efficiency and environmental protection.

DETAILED DESCRIPTION

Figure 1:
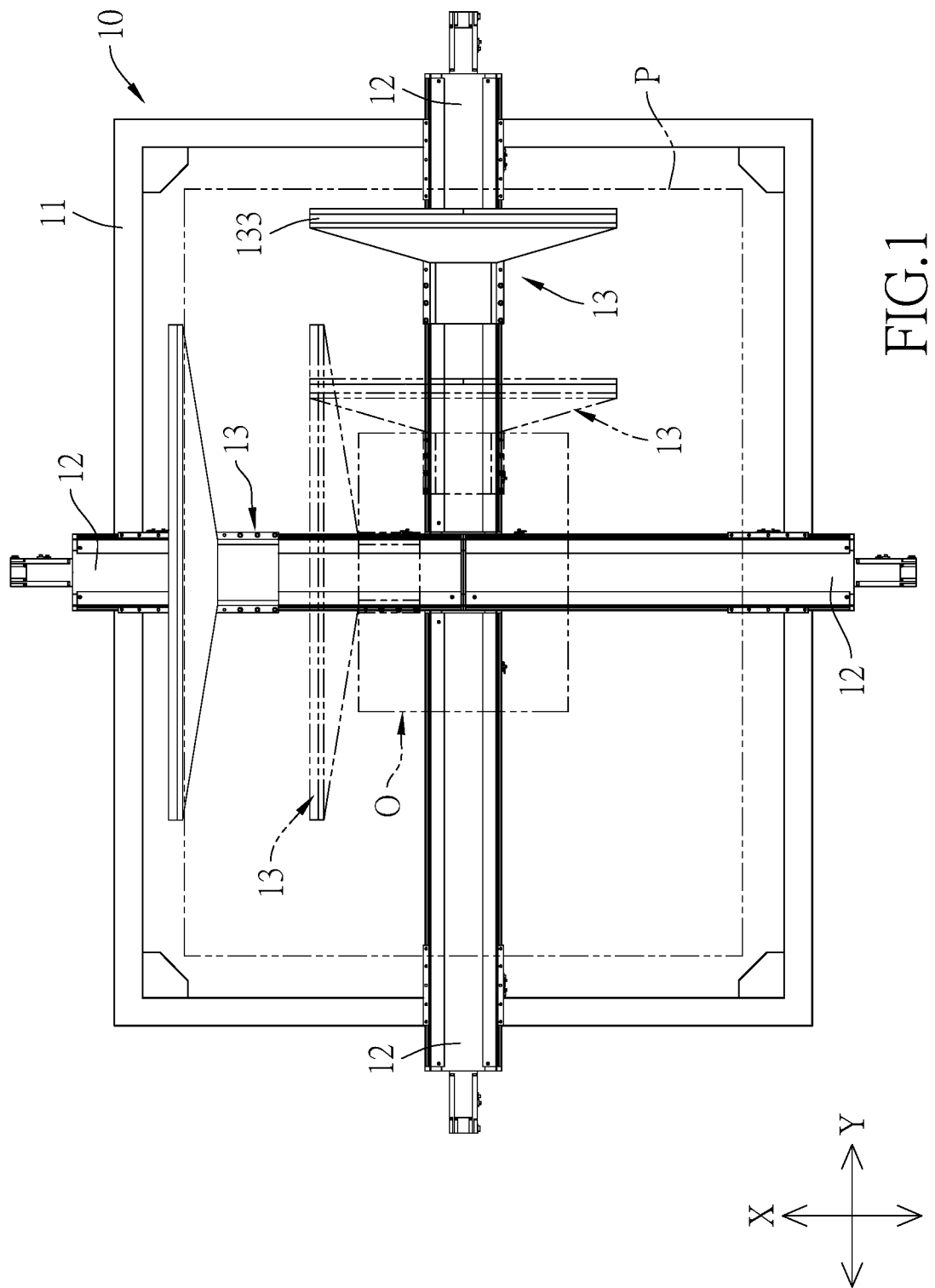
FIG. 1 is a top view of the frame disassembly system.

The invention provides an automated dismantling and separation system for solar panels, as shown in FIG. 1-16, comprising:

A frame disassembly system 10 is provided with a carrying platform 11, on which a plurality of linear transmission devices 12 are arranged, and a clamp 13 is detachably disposed to each of the linear transmission devices 12 and driven to move linearly by the linear transmission devices 12. Since the clamps 13 are detachably disposed to the linear transmission device 12, the user may replace clamps 13 of different sizes in response to solar panels P of different sizes, and the clamps 13 are used to clamp an aluminum frame F of a solar panel P. In the present embodiment, the number of the linear transmission devices 12 and the clamps 13 is four, two of the four linear transmission devices 12 are oppositely arranged along a longitudinal direction X, and the clamps 13 disposed to the two linear transmission devices 12 are movable along the longitudinal direction X. Two other linear transmission devices 12 are oppositely disposed along a transverse direction Y, the clamps 13 disposed to the other two linear transmission devices 12 are movable along the transverse direction Y, and the transverse direction Y is perpendicular to the longitudinal direction X. The linear transmission devices 12 may include, but are not limited to, linear slides, servomotors, and such linear transmission devices 12 may also include pneumatic turbine vortices and connecting rods.

In other embodiments, two of the clamps 13 are detachably disposed to the linear transmission devices 12, and the clamps 13 are fixed to the linear transmission devices 12.

Figure 2A:
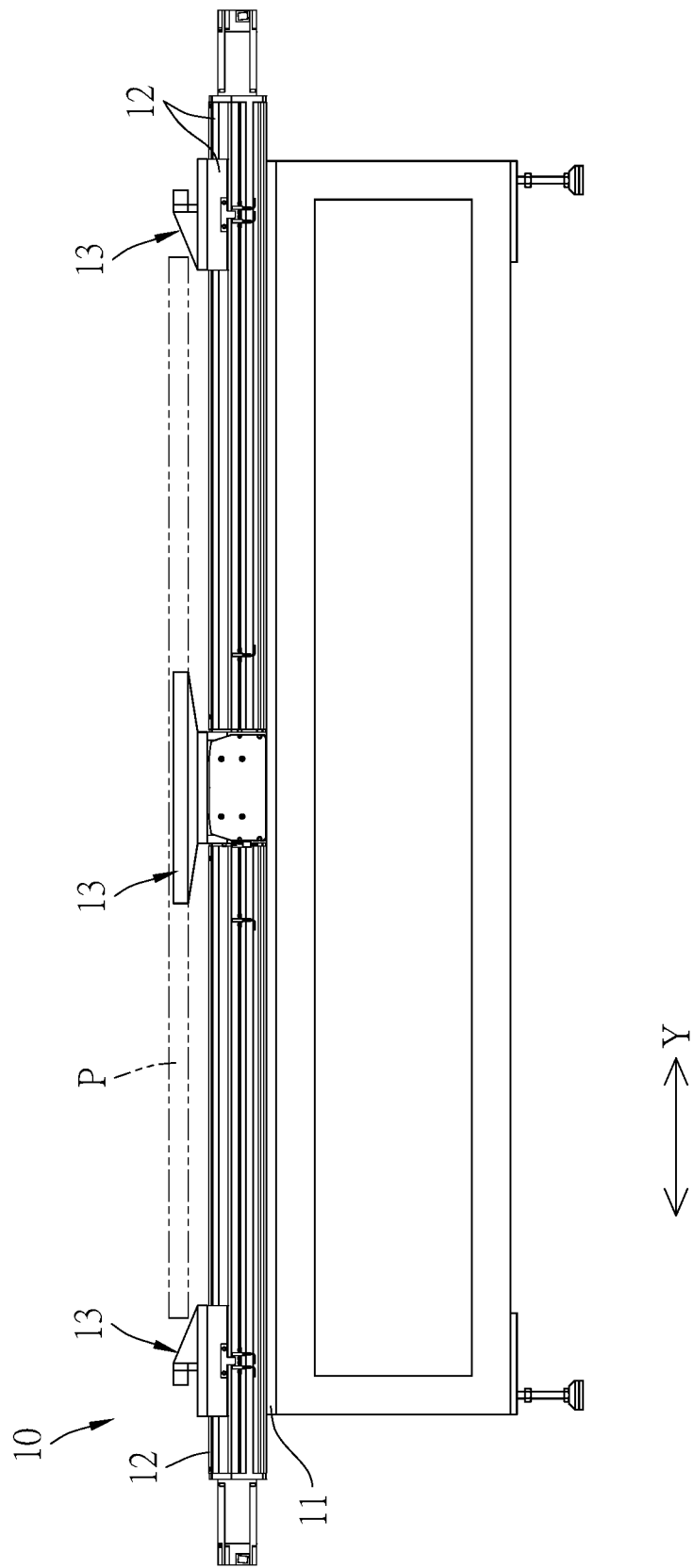
FIG. 2A shows a side view of the frame disassembly system.
Figure 2B:
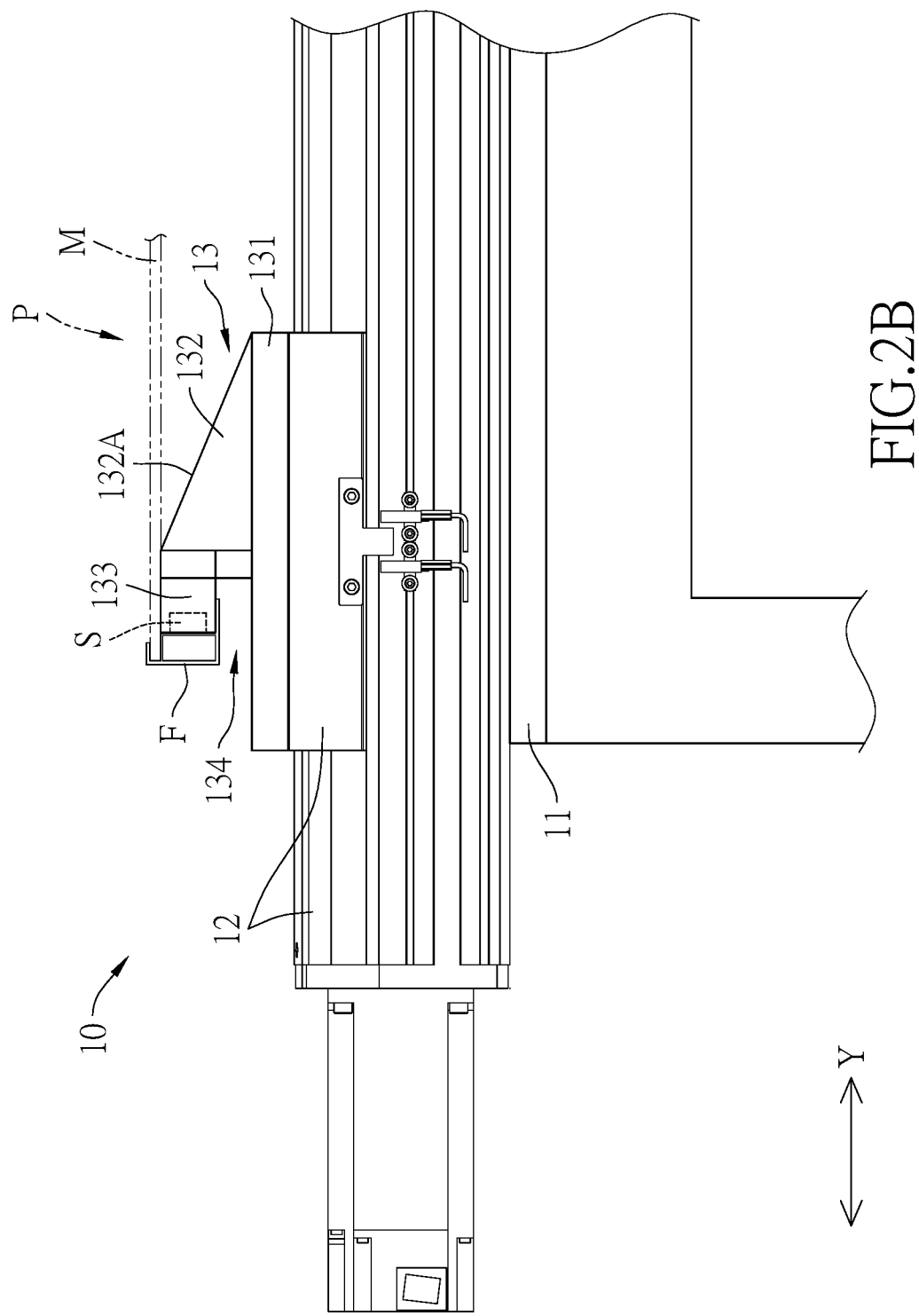
FIG. 2B is a schematic diagram showing the frame disassembly system is dismantling an aluminum frame.

Referring to FIGS. 2A and 2B, the clamps 13 each include a bottom 131, a diagonal guide portion 132, and a support portion 133. The bottom 131 is disposed to the linear transmission device 12, and the diagonal guide portion 132 is located on a surface of the bottom 131 opposite the one thereof disposed to the linear transmission device 12. The diagonal guide portion 132 includes a guide slope 132A, which is provided for leaning against the solar panel P to facilitate the slippage of the clamps 13 to a position under the solar panel P, the support portion 133 is located on a side of the diagonal guide portion 132 facing away from the guide slope 132A, and the support portion 133 is provided for leaning against the aluminum frame F. There is a distance between the support portion 133 and the bottom 131 to form a hook space 134. The hook space 134 is provided to accommodate an aluminum frame F so that the clamps 13 can fix the aluminum frame F, and when the clamp 13 is driven to move by the linear transmission device 12, the clamps 13 can remove the aluminum frame F of the solar panel P. Define the solar panel P after removing the aluminum frame F as a stack material M;

Please refer to FIG. 2B, the invention preferably further includes a plurality of sensing devices S, which are respectively installed at the end of the support portion 133 that is not connected to the diagonal guide portion 132. The sensing devices S are touch sensors, thereby ensuring that the support portion 133 of the clamps 13 touches the aluminum frame F, and only when all sensing devices S sense the aluminum frame F, can the clamps 13 be driven to move synchronously, so as to achieve the effect of synchronously removing different sides of the aluminum frame F, and thereby make the aluminum frame F evenly stressed.

Preferably, a rubber strip can be installed at the end of the diagonal guide portion 132 that is not connected to the support portion 133. The rubber strip can use superior adhesive, and the sensing devices S can be located among the plurality of rubber strips.

Figure 3A:
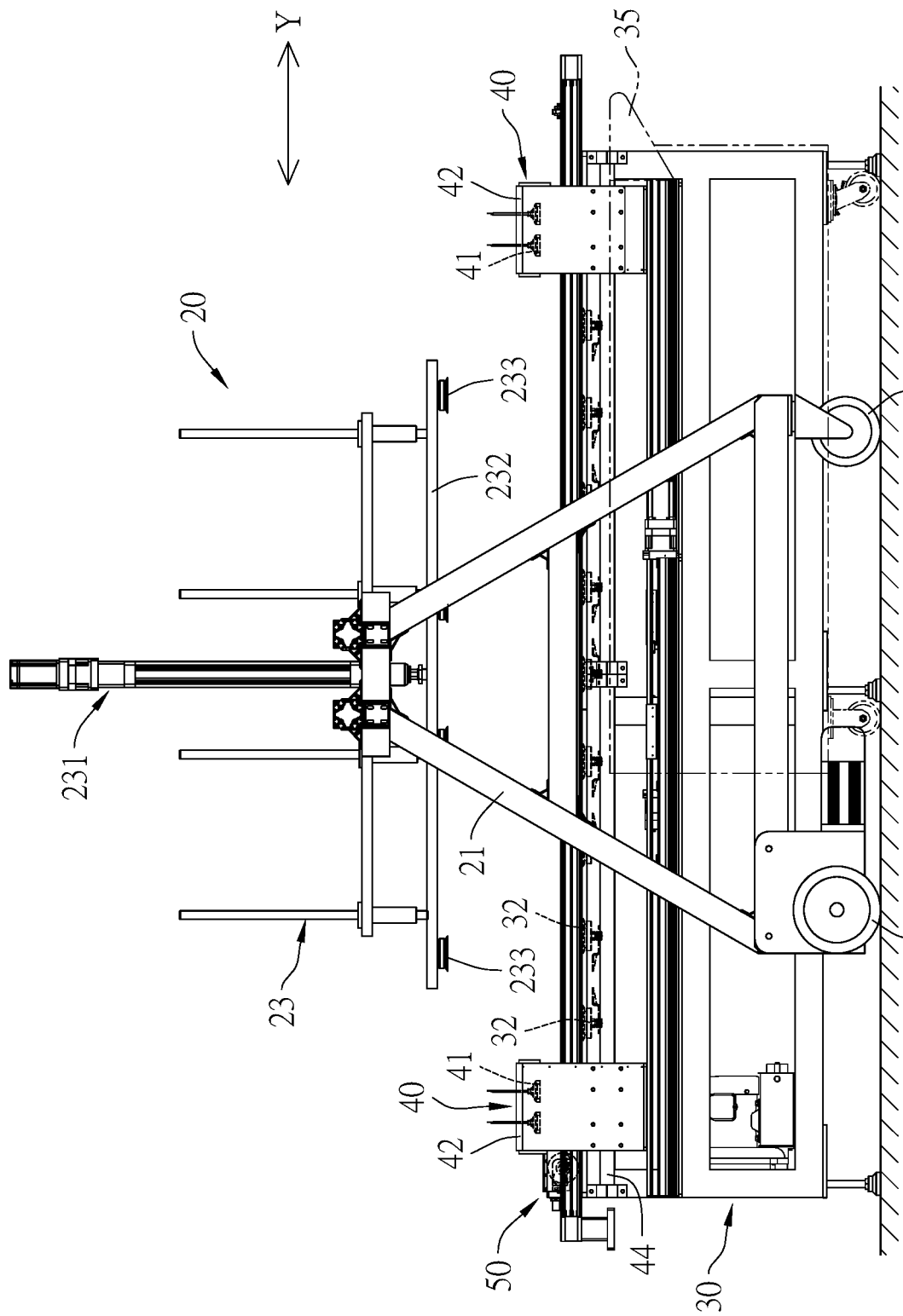
FIG. 3A shows a side view of the stack material disassembly system and the handling device.
Figure 3B:
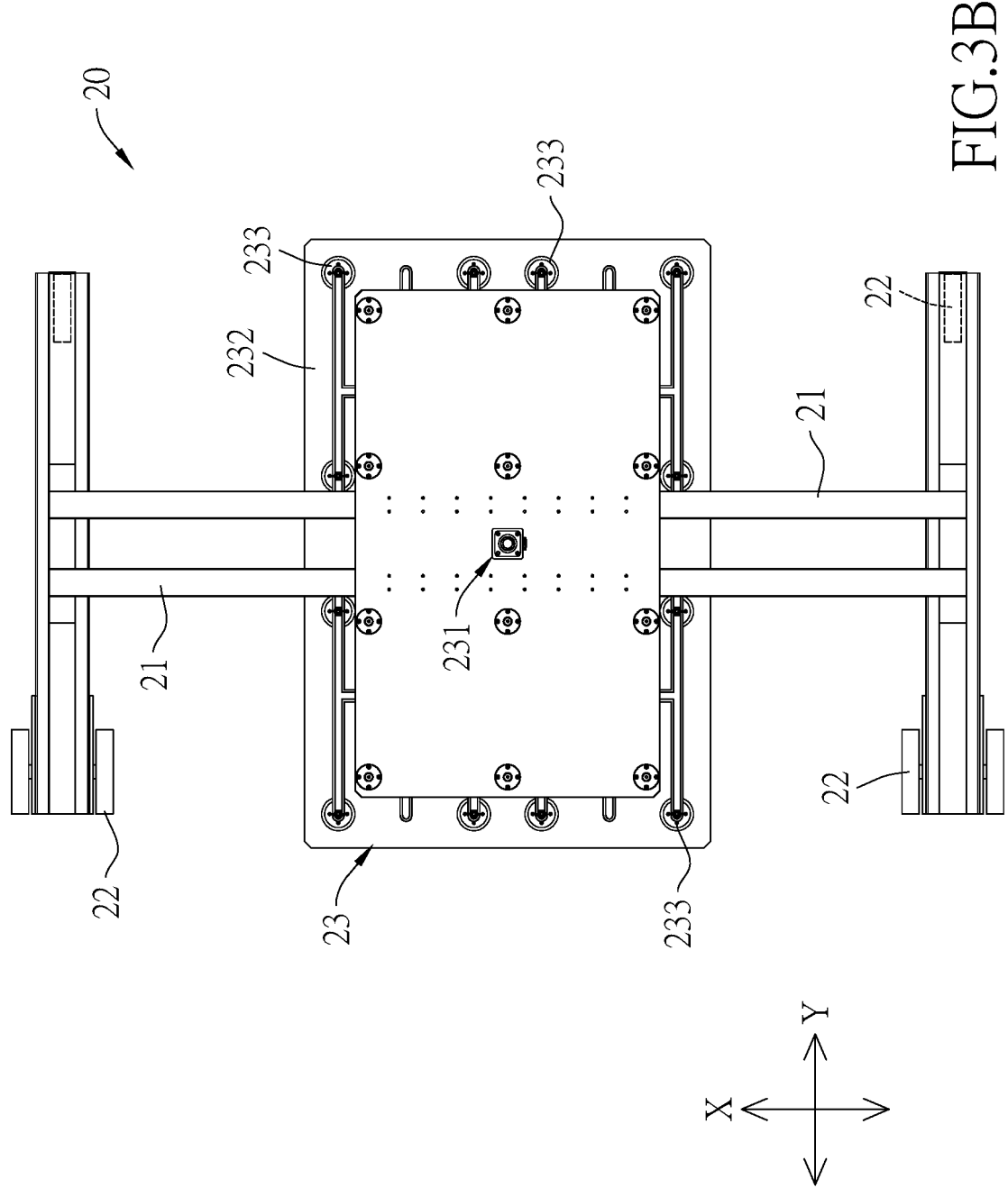
FIG. 3B is a top view of the handling device.
Figure 5:
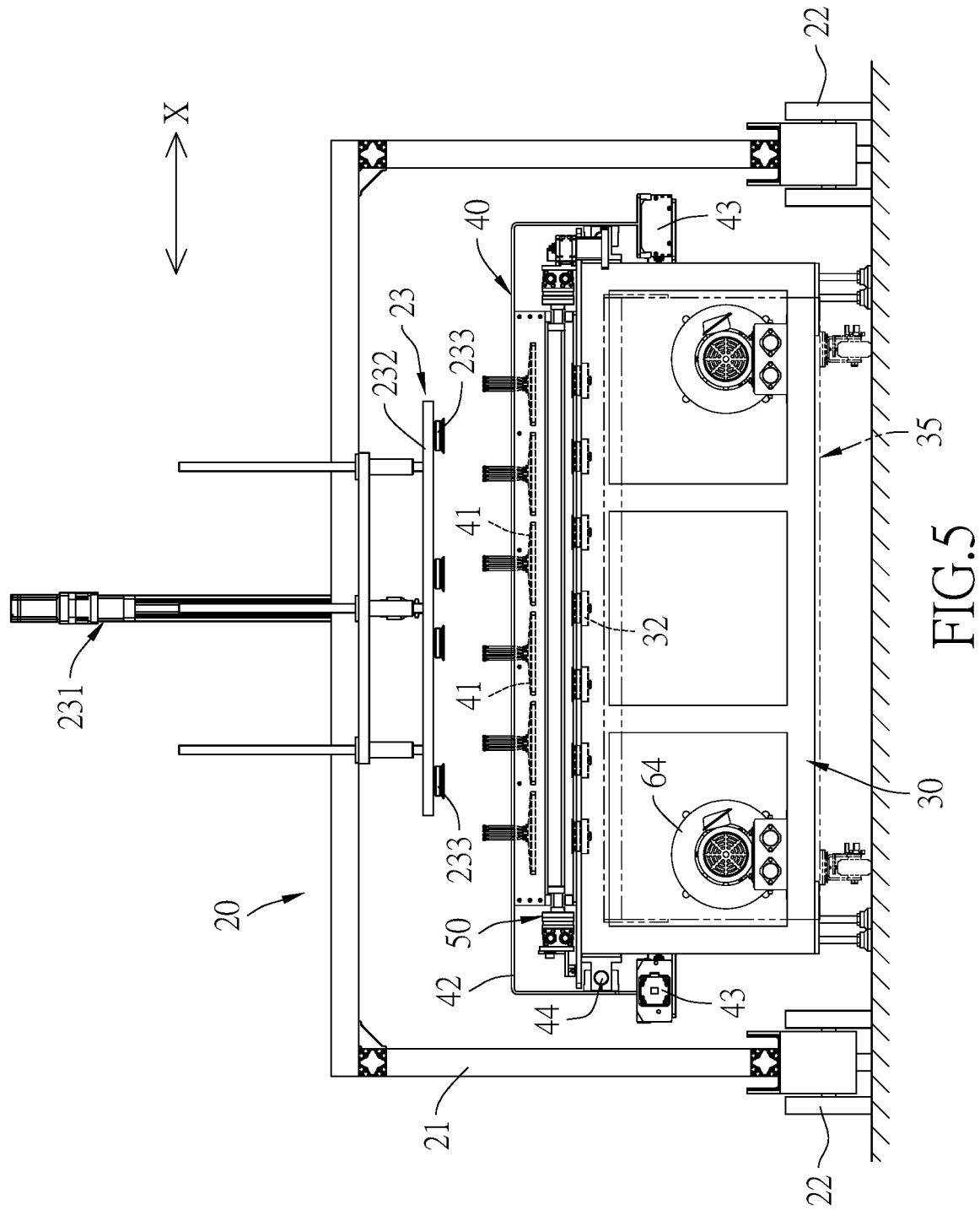
FIG. 5 shows a side view of the stack material disassembly system and the handling device.
Figure 6:
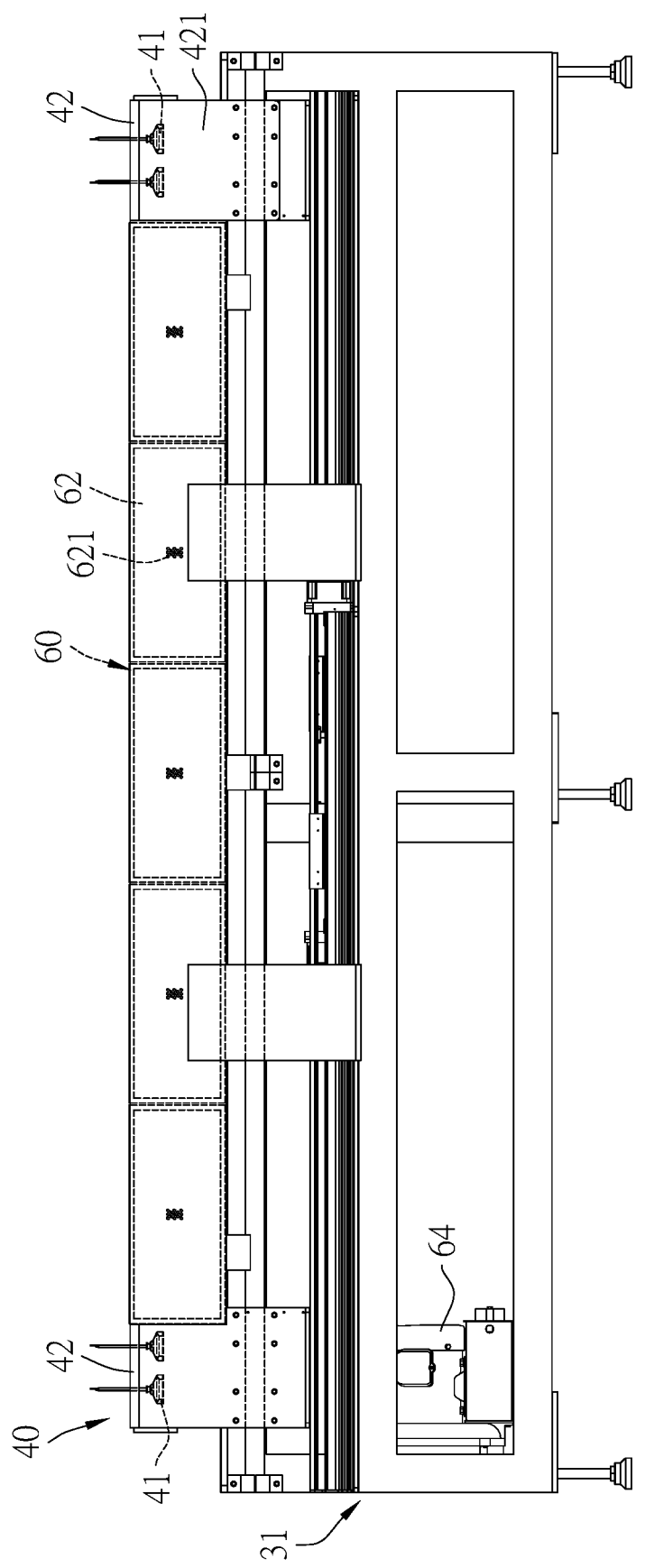
FIG. 6 shows a side view of the heating and temperature control module applied to the disassembly platform.

Refer to FIG. 3A, 3B, 5, a handling device 20 is provided for carrying the solar panel P. In this embodiment, the handling device 20 has a main frame 21, which is equipped with a plurality of rollers 22 and a sucker module 23. The sucker module 23 includes a sucker drive device 231, a sucker support 232, and a plurality of suckers 233. The sucker drive device 231 is disposed to the main frame 21, the sucker support 232 is disposed to the sucker drive device 231, and can be driven to move up and down by the sucker drive device 231, the suckers 233 are disposed to the sucker support 232 and are provided for absorbing the solar panel P or the stack material M. The sucker drive device 231 can be, but is not limited to, a pneumatic cylinder.

Preferably, the sucker support 232 may include a slide rail to enable the suckers 233 to move along the sucker support 232 to adjust the position of the suckers 233 to cope with different sizes of solar panels P or stack materials M.

In other embodiments, the handling device 20 may also be a mechanical arm.

Refer to FIGS. 6-16, a stack material disassembly system 30 includes a disassembly platform 31, a plurality of bottom suckers 32, a heating and temperature control module 40, and a scraper module 50;

The disassembly platform 31 is generally rectangular, and includes a first side 31A and a second side 31B opposite to each other. The first side 31A and the second side 31B each include a first edge 311, and the two first edges 311 are spaced by a distance and extend along a transverse direction Y. The two first edges 311 each have one end connected to a second edge 312 and the other end connected to another second edge 312. The two second edges 312 extend along a longitudinal direction X and are spaced by a distance. The transverse direction Y is perpendicular to the longitudinal direction X, the disassembly platform 31 includes a table 313, which is equipped with bottom suckers 32 for adsorbing the stack material M, and the suction force of the bottom suckers 32 is greater than that of the suckers 233.

The heating and temperature control module 40 includes a heating unit 41, a moving frame 42 and a linear drive device 43. The linear drive device 43 is connected to and drives the moving frame 42 to move along the transverse direction Y. The moving frame 42 includes two side plates 421 and a top plate 422. The two side plates 421 are connected to opposite two ends of the top plate 422 respectively, the top plate 422 extends along the longitudinal direction X, the extension direction of the top plate 422 is perpendicular to the extension direction of the two side plates 421, and the two side plates 421 and the top plate 422 collectively define a thermal space 423. The two side plates 421 are located at the first side 31A and the second side 31B respectively. The heating unit 41 is disposed to the top plate 422 of the moving frame 42, located in the thermal space 423, and is movable along the transverse direction Y. Since the heating unit 41 is located in the thermal space 423, so that heat energy is not easy to escape from the thermal space 423 to increase the effect of heat insulation.

Preferably, one side of the top plate 422 along the transverse direction Y includes a baffle plate 424 to enhance the effect of heat insulation.

In another embodiment, two sides of the top plate 422 along the transverse direction Y include a baffle plate 424, respectively, to enhance the heat insulation.

In the present embodiment, refer to FIGS. 6-9, the number of the heating units 41 is plural, the number of the moving frame 42 and the linear drive device 43 is two, and there are also two guide rods 44. One of the linear drive devices 43 is disposed to the first side 31A of the disassembly platform 31. Another linear drive device 43 is disposed to the second side 31B of the disassembly platform 31. One of the guide rods 44 is disposed to the first side 31A of the disassembly platform 31, another guide rod 44 is disposed to the second side 31B of the disassembly platform 31, and the two moving frames 42 are arranged along the longitudinal direction X. One side plate 421 of the two moving frames 42 is fixed on one of the linear drive devices 43, and the other side plate 421 of the two moving frames 42 can be movably disposed to one of the guide rods 44. The two linear drive devices 43 are provided to drive the two moving frames 42 to move along the transverse direction Y, so that the two moving frames 42 can approach or move away from each other. The two moving frames 42 are respectively equipped with the heating units 41, the number of heating units 41 disposed to the two moving frame 42 may be increased or decreased as desired, and the heating units 41 are spaced a distance from the table 313. In the present embodiment, the linear drive device 43 may include a linear slide rail, a servomotor, and a linear drive device 43. The heating unit 41 can be a far infrared heater, but not limited thereto, and the linear drive device 43 can be an electric slide table.

Figure 9:
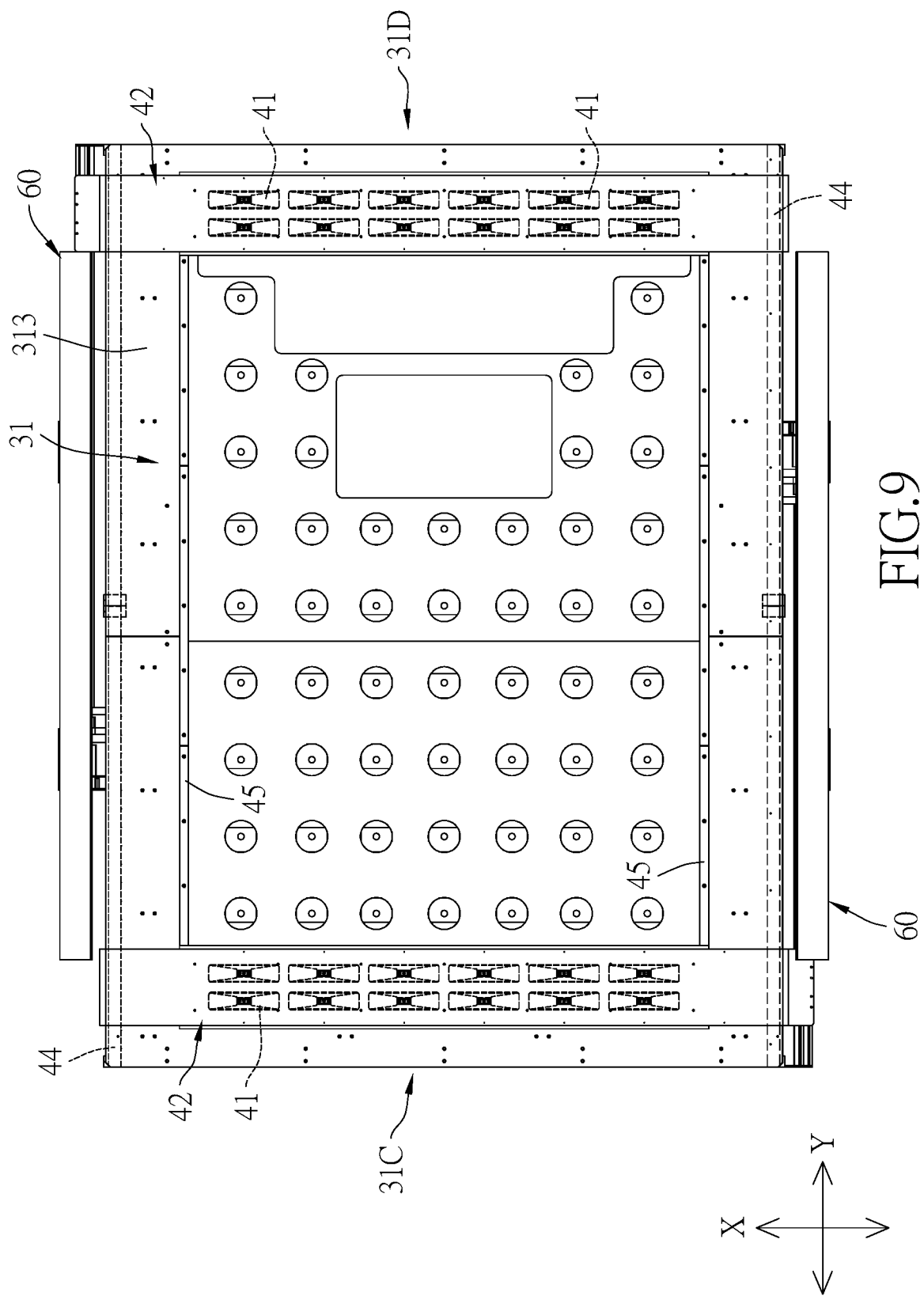
FIG. 9 is a top view of the heating and temperature control module applied to the disassembly platform.
Figure 10:
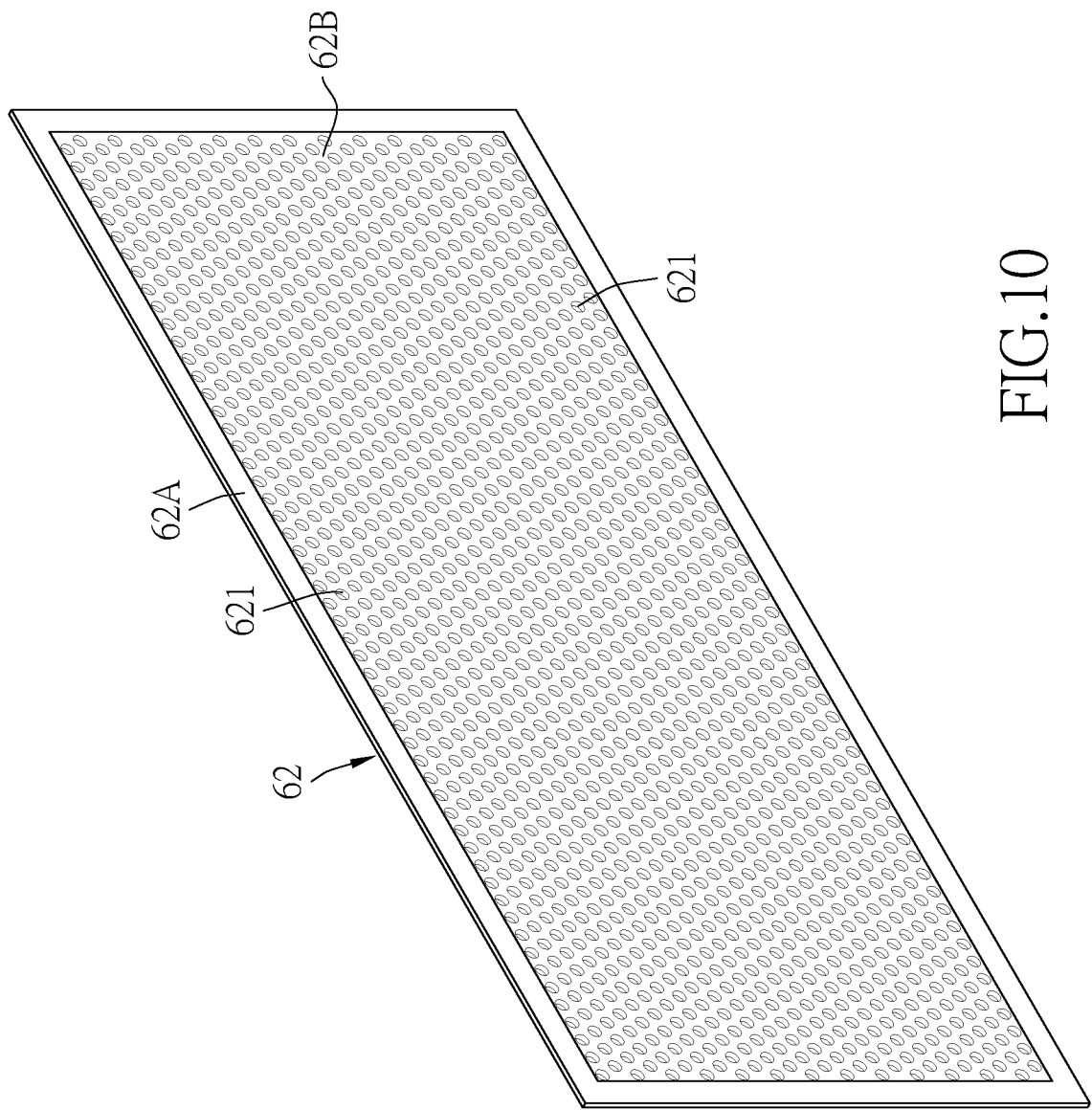
FIG. 10 is a three-dimensional view of the filter screen of the present invention.
Figure 11:
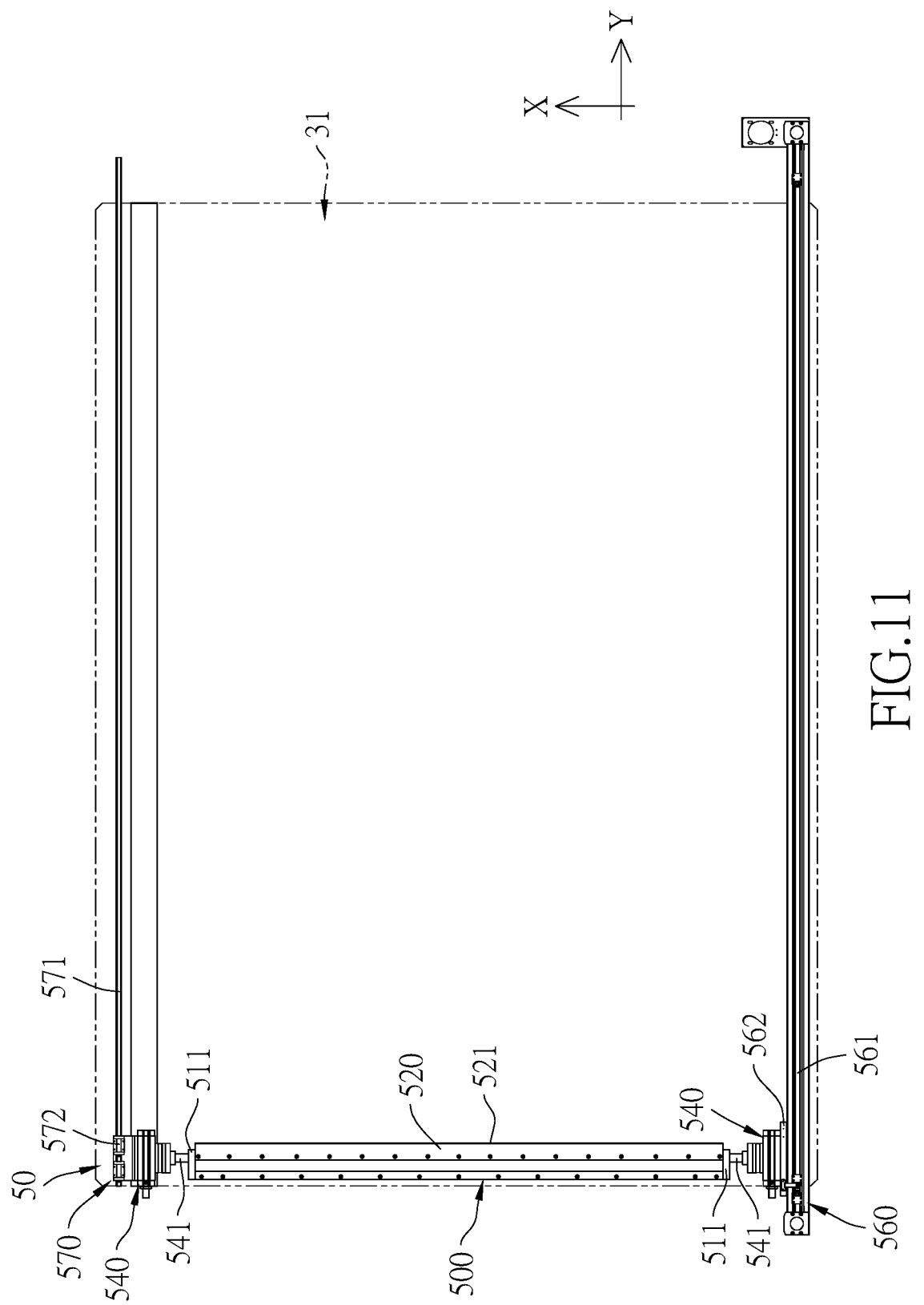
FIG. 11 is a schematic diagram of the application of the scraper and the scraper module of the present invention to the disassembly platform.
Figure 12:
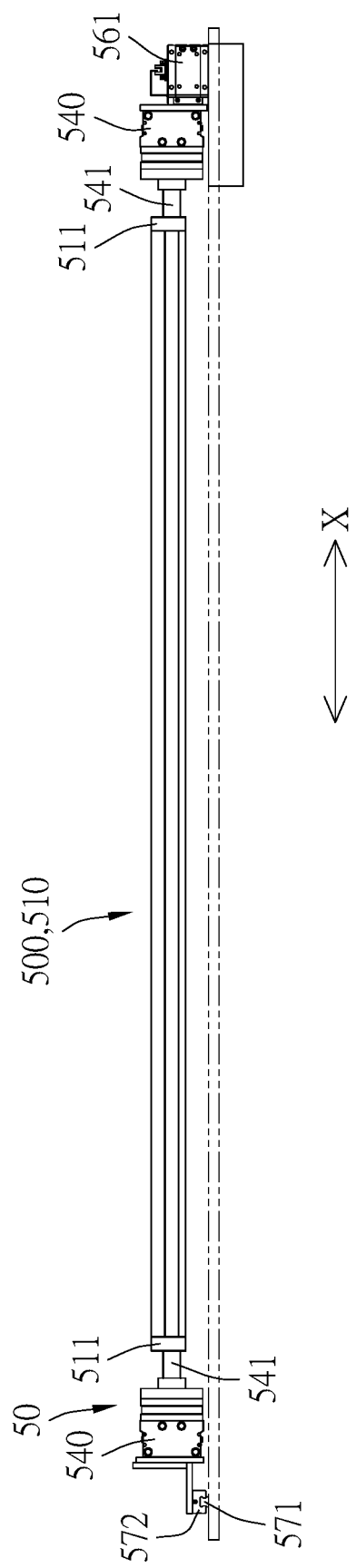
FIG. 12 shows a side view of the scraper and the scraper module of the present invention.
Figure 13:
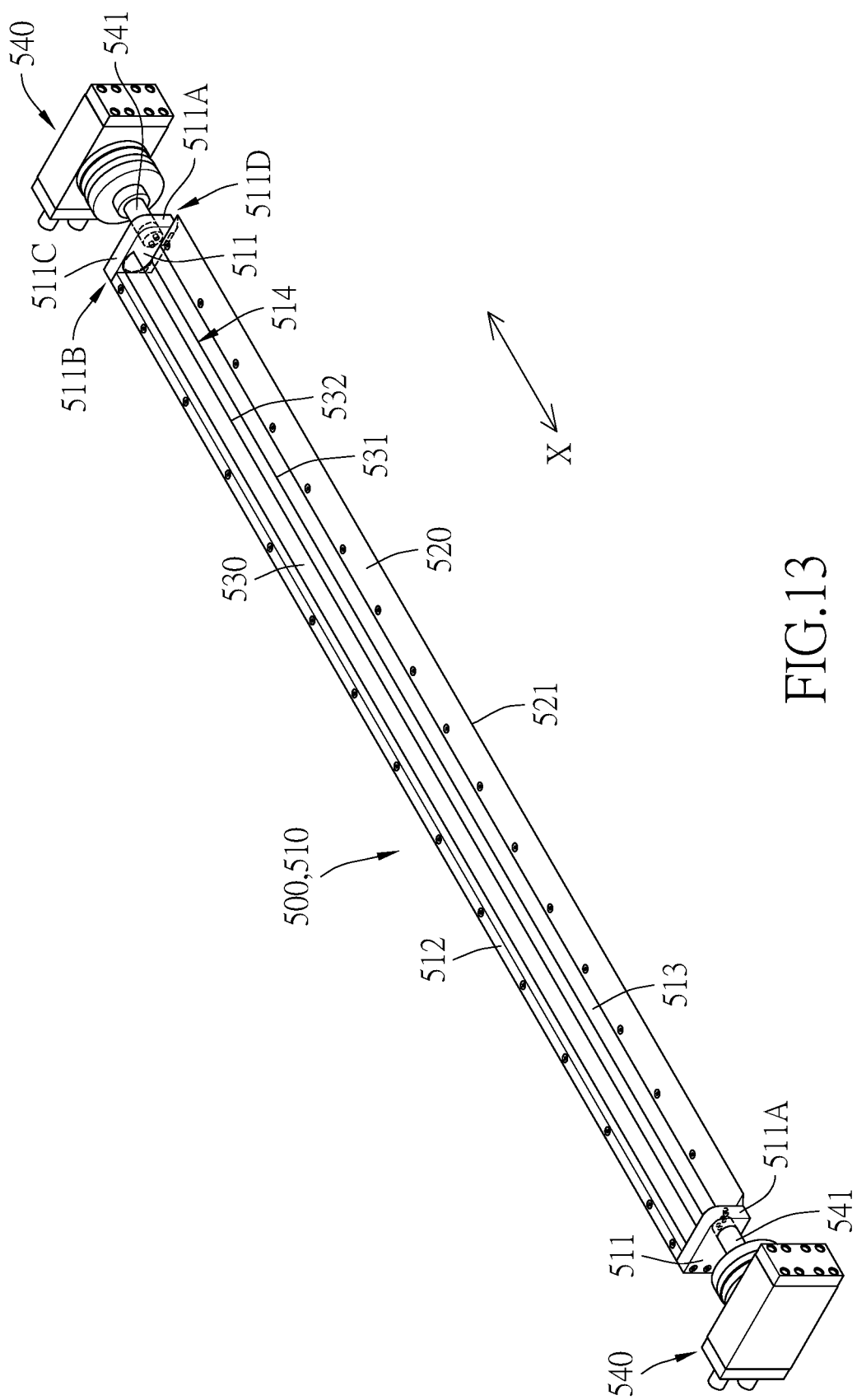
FIG. 13 is a perspective view of the scraper and the scraper module of the present invention.

In this embodiment, referring to FIG. 9, the two opposite ends of the disassembly platform 31 along the transverse direction Y are a first end 31C and a second end 31D, and the number of the heating unit 41 is plural, wherein one of the moving frames 42 moves from the first end 31C to a position between the first end 31C and the second end 31D, and another moving frame 42 is moved from the second end 31D to a position between the first end 31C and the second end 31D.

Figure 7:
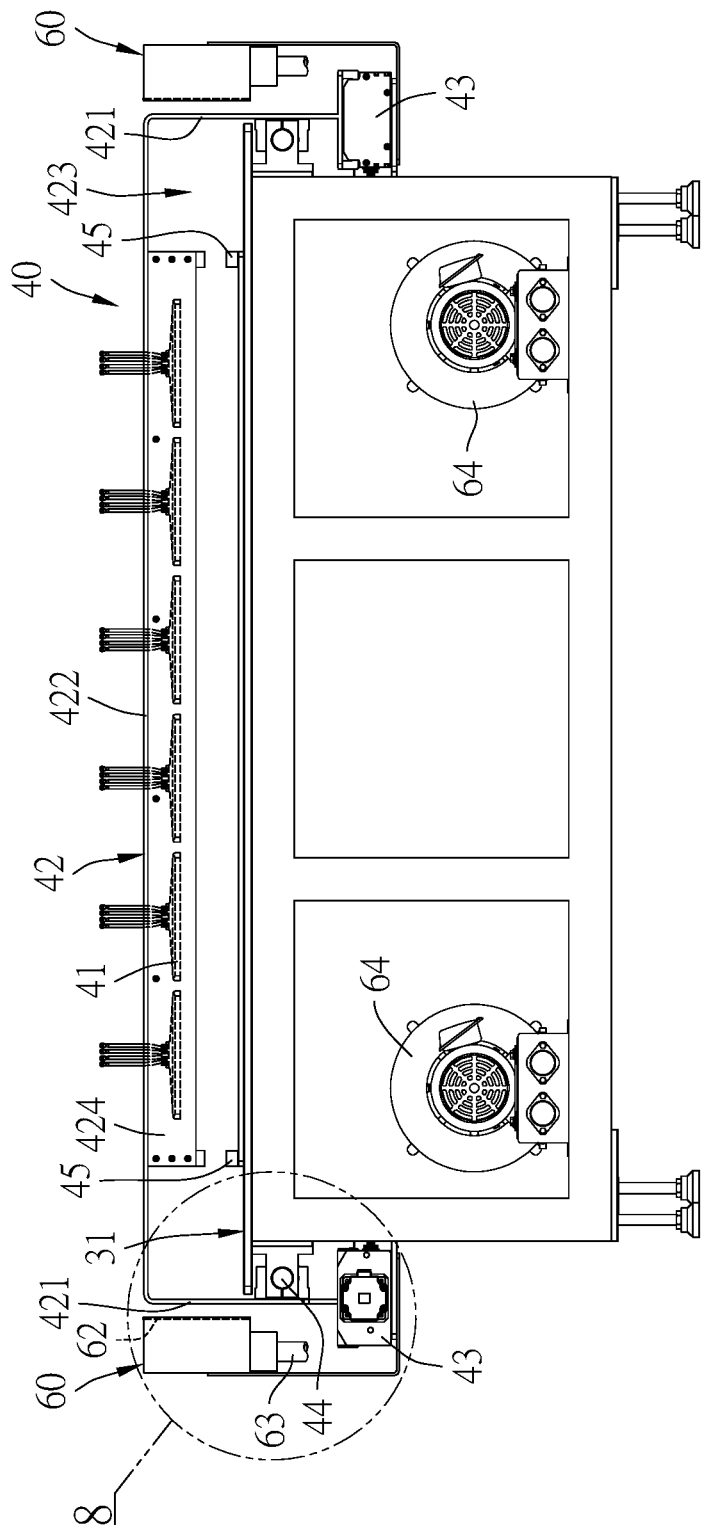
FIG. 7 shows another side view of the heating and temperature control module applied to the disassembly platform from another perspective.
Figure 8:
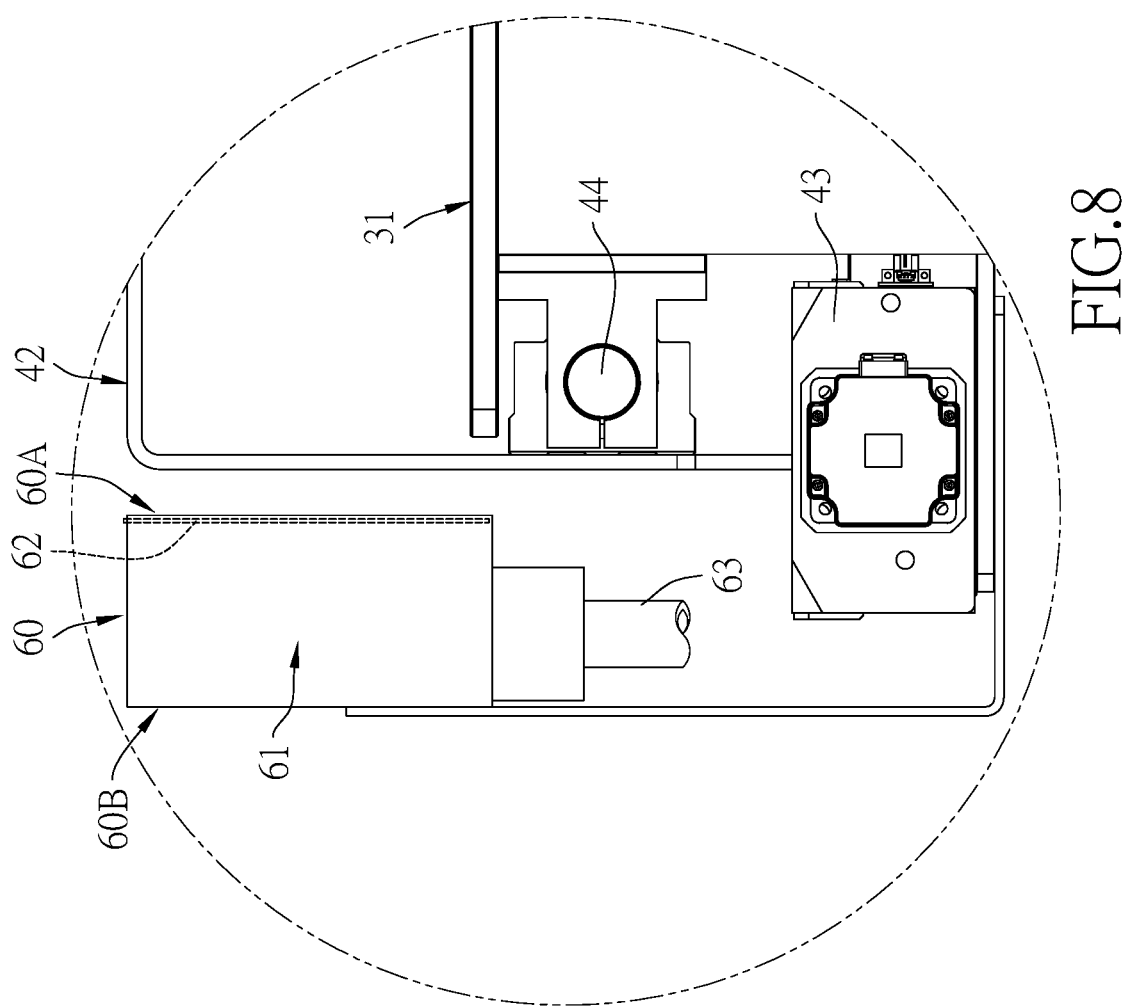
FIG. 8 shows a partially enlarged view of the heat barrier wall.

Preferably, please refer to FIGS. 7 and 9, the table 313 further includes two heat barriers 45, the material of the two heat barriers 45 is ceramic, but not limited thereto, the two heat barriers 45 extend along the transverse direction Y, one of which is closer to the first edge 311, and the other is closer to the second edge 312. The two heat barriers 45 protrude by a height from the table 313 to enhance the heat preservation effect.

Preferably, there are also two heat barrier walls 60, which are arranged at the first side 31A and the second side 31B respectively, the two heat barrier walls 60 extend along the transverse direction Y, and are adjacent to the two first edges 311 respectively. Preferably, the positions of the two heat barrier walls 60 are higher than the table 313. By arranging the two heat barrier walls 60 at the first side 31A and the second side 31B, the heat energy of the disassembly platform 31 is not easy to escape from the first side 31A and the second side 31B. When the moving frame 42 moves through the two heat barrier walls 60, one of the side plates 421 is located between one of the first edges 311 and one of the heat barrier walls 60, and another of the side plates 421 is located between another of the first edges 311 and another one of the heat barrier walls 60, and the width of the two side plates 421 along the transverse direction Y is less than the width of the two heat barrier walls 60 along the transverse direction Y.

Preferably, the two heat barrier walls 60 are generally hollow structures, can be a rectangular hollow structure, the two heat barrier walls 60 each have an inner space 61, the surfaces of the two heat barrier walls 60 facing each other each are an inner surface 60a, and the surfaces of the two heat barrier walls 60 facing away from each other each are an outer surface 60b. The inner surface 60a of each of the two heat barrier walls 60 is equipped with a filter screen 62, and the filter screens 62 each have a plurality of holes 621, the filter screen 62 may include a metal layer 62A, an activated carbon layer 62B, etc., but is not limited thereto, and the holes 621 of the filter screens 62 are in communication with the inner spaces 61. One end the two heat barrier walls 60 facing the linear drive device 43 is connected with at least one end of a vent pipe 63, and the other end of the vent pipe 63 is connected with an air extraction motor 64. The air extraction motor 64 is provided for sucking the air in the disassembly platform 31, so that the air in the disassembly platform 31 passes through the filter screen 62 for filtering and deodorizing, then it is introduced into the inner spaces 61 and discharged through the air extraction motor 64 to achieve the effect of removing odor.

The scraper module 50 includes a scraper 500, two rotating mechanisms 540, a power mechanism 550, a linear transmission mechanism 560, and an auxiliary sliding mechanism 570, as shown in FIG. 11-16.

The scraper 500 includes:

A body 510, generally in a long strip shape, extends along a longitudinal direction X. Two opposite ends of the body 510 along the longitudinal direction X each include a lateral wall 511, between the two lateral walls 511 are connected a rear wall 512 and a bottom wall 513, and the rear wall 512 and the bottom wall 513 extend along the longitudinal direction X. The rear wall 512 and the bottom wall 513 have one end connected with each other, and the rear wall 512 and the bottom wall 513 are connected vertically to each other, so that the rear wall 512 and the bottom wall 513 form a generally L-shaped structure. The two lateral walls 511 each include a front end 511A and a rear end 511B opposite to each other, and the rear wall 512 is connected to the rear ends 511B of the two lateral walls 511. The two lateral walls 511 each further include a top end 511C and a bottom end 511D opposite to each other, and the bottom wall 513 is connected to the bottom ends 511D of the two lateral walls 511. The two lateral walls 511, the rear wall 512 and the bottom wall 513 collectively define a space 514, and the bottom wall 513 includes a top surface 513A facing the space 514.

A blade 520, generally in the shape of a long strip, extends along the longitudinal direction X. The blade 520 is connected to one end of the bottom wall 513 that is not connected to the rear wall 512, and includes a tip 521, which is used to remove an adhesive layer G, in other embodiments, the blade 520 can also be integrally formed with the body 510.

A reeling member 530, disposed to the body 510, is located in the space 514. The reeling member 530 is an arc-shaped sheet, in this embodiment, the reeling member 530 is a semicircular arc sheet larger than a semicircle. Please refer to FIGS. 13-15, the reeling member 530 includes a first arc end 531 and a second arc end 532 opposite to each other, and the first arc end 531 is abutted against the top surface 513A. The reeling member 530 includes an inner arc surface 530A and an opposite outer arc surface 530B, the outer arc surface 530B is abutted against the rear wall 512, and the inner arc surface 530A is used to accommodate and roll up the removed adhesive. The first arc end 531 is oriented in the same direction as the tip 521.

Preferably, the bottom wall 513 includes a step groove 513B at the top surface 513A, and the step groove 513B is closer to the rear wall 512 and further away from the blade 520. The first arc end 531 of the reeling member 530 is located in the step groove 513B so that the first arc end 531 is connected to the top surface 513A.

Figure 14:
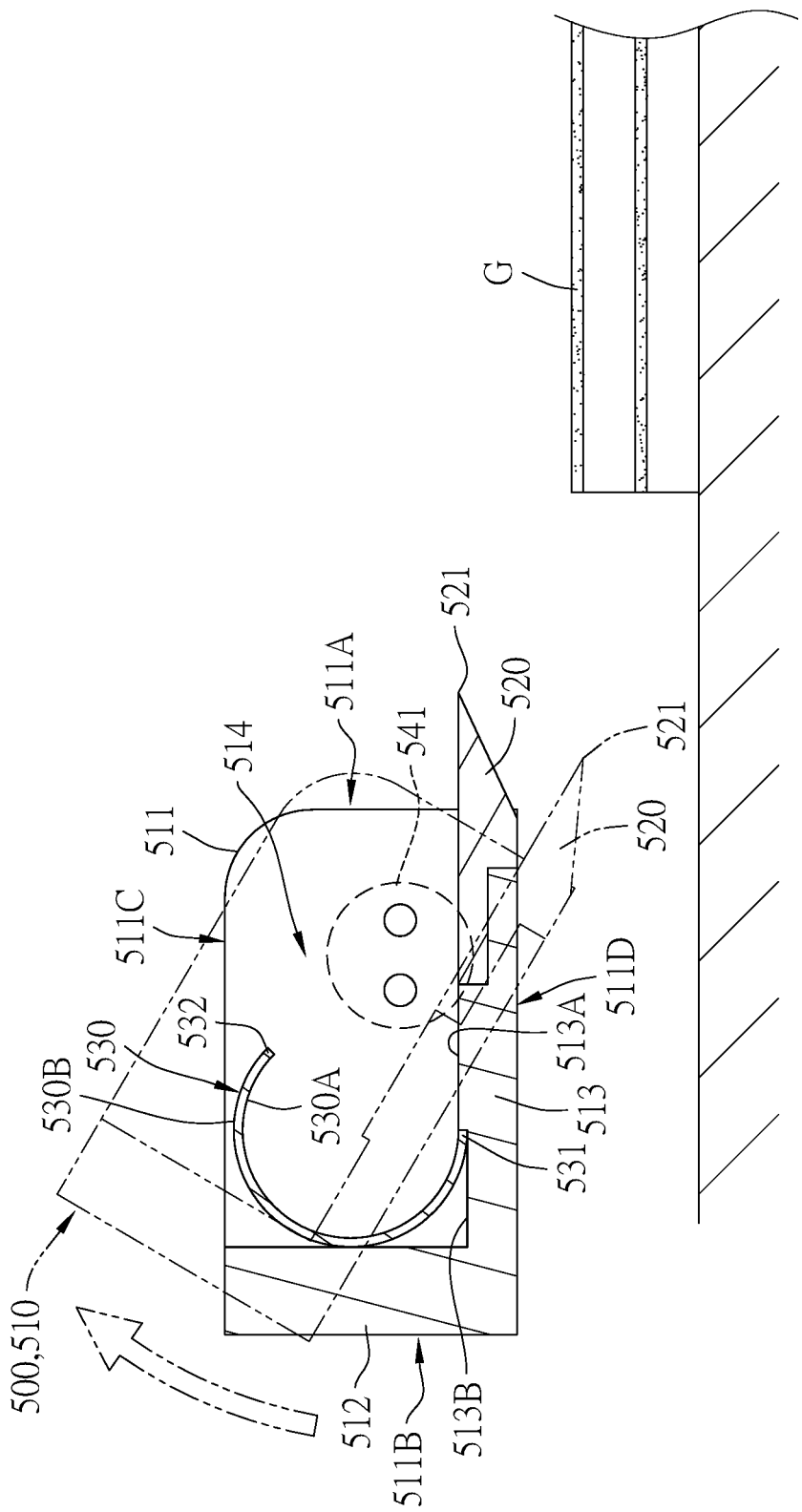
FIG. 14 is a schematic diagram of the scraper and the scraper module of the present invention for removing the adhesive layer of the solar photovoltaic module.
Figure 15:
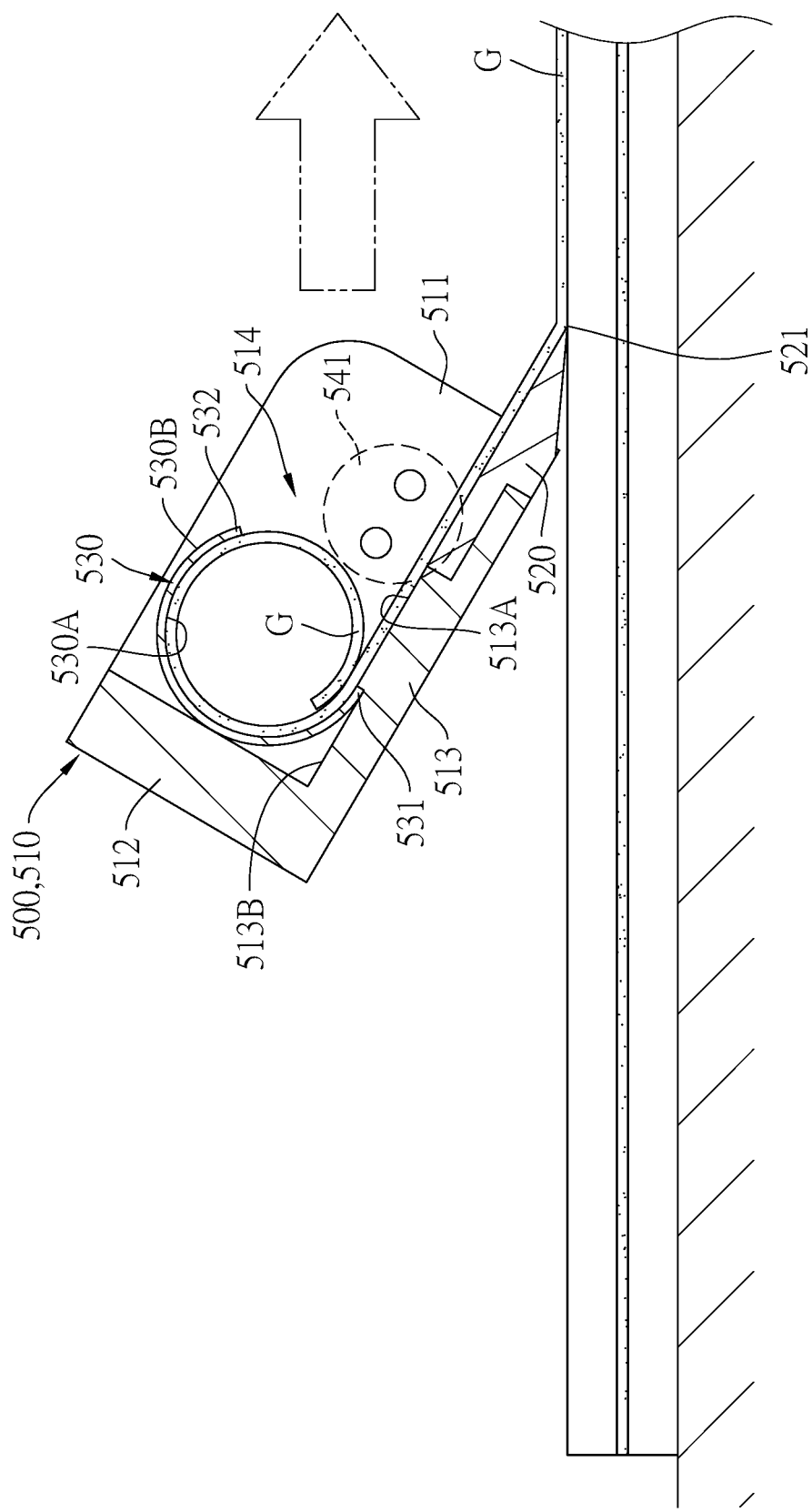
FIG. 15 is a schematic diagram of the scraper and the scraper module of the present invention for removing the adhesive layer of the solar photovoltaic module.
Figure 16:
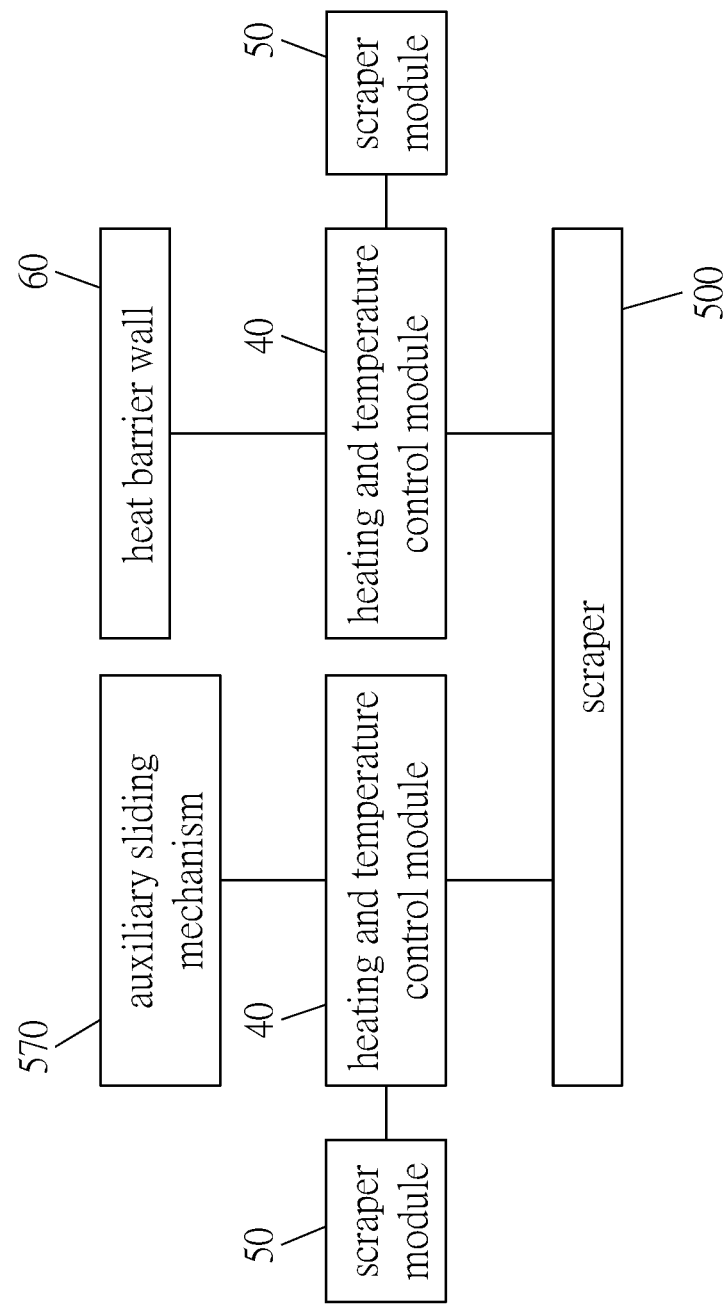
FIG. 16 is a schematic diagram of the scraper module of the present invention.

Please refer to FIGS. 14 and 15, when the blade 520 removes the adhesive layer G, the adhesive layer G will be removed in a whole piece and rolled up along the inner arc surface 530A of the reeling member 530. This not only allows for complete and continuous removal of the adhesive layer G without interruption during the scraping process, but also allows for proper collection of the scraped adhesive, greatly reducing the generation of residual adhesive and chips, thereby reducing the difficulty of subsequent processing procedures.

The two rotating mechanisms 540, respectively, are arranged on two opposite sides of the body 510 along the longitudinal direction X. The two rotating mechanisms 540 are connected to the two opposite sides of the body 510, and are used to drive the body 510 to rotate. In this embodiment, the two rotating mechanisms 540 each include a rotating shaft 541, and the two rotating shafts 541 are respectively connected with the lateral walls 511. The two rotating mechanisms 540 can be a rotating air cylinder, but not limited thereto. The two rotating mechanisms 540 can also be a combination of a rotating oil cylinder, a motor and a gear, etc.

The power mechanism 550 is connected with the two rotating mechanisms 540, which is used to drive the two rotating mechanisms 540 and the scraper 500 to rotate, and make the blade 520 tilt at a fixed angle and exerts a certain pressure during the process of removing the adhesive layer G, so as to enhance the effect of removing adhesive. In this embodiment, the power mechanism 550 can be an air compressor, but is not limited thereto.

Preferably, the output pressure of the power mechanism 550 ranges from 60 to 80 MPa, allowing the blade 520 to maintain a downward pressure when removing the adhesive layer.

The linear transmission mechanism 560 is disposed to one side of the disassembly platform 31 and movable along the transverse direction Y. One of the rotating mechanisms 540 is disposed to the linear transmission mechanism 560, the linear transmission mechanism 560 drives the rotating mechanism 540 and the scraper 500 to move along the transverse direction Y, so that the scraper 500 can be moved from one end of the disassembly platform 31 to the other end for scraping operations.

Preferably, the linear transmission mechanism 560 includes a slide rail 561 and a slider 562, the slider 562 is movable along the transverse direction Y relative to the slide rail 561, the slide rail 561 extends along the transverse direction Y, the rotating mechanism 540 is disposed to the slider 562, the slider 562 is driven by an electric cylinder, allowing the slider 562 to move back and forth on the slide rail 561.

The auxiliary sliding mechanism 570 is disposed to the other side of the disassembly platform 31, and movable along the transverse direction Y. Another one of the rotating mechanisms 540 is disposed to the auxiliary sliding mechanism 570, the auxiliary sliding mechanism 570 drives the rotating mechanism 540 and the scraper 500 to move along the transverse direction Y, allowing the scraper 500 to move from one end of the disassembly platform 31 to the other end for scraping operations.

Preferably, the auxiliary sliding mechanism 570 includes a slide rail 571 and a slider 572, the slider 572 is movable along the transverse direction Y relative to the slide rail 571, the slide rail 571 extends along the transverse direction Y, and one of the rotating mechanisms 540 is disposed to the slider 572, but are not limited thereto.

In other embodiments, the auxiliary sliding mechanism 570 can also include a guide rod, a sliding sleeve, and the rotating mechanism is disposed to the slider.

Preferably, the linear transmission mechanism 560 drives the rotating mechanisms 540 and the scraper 500 to move from the first end 31C to the second end 31D for one-way scraping.

Preferably, the temperature of the heating unit 41 is controlled between 130° C. and 200° C.

Preferably, a collection groove 35 is disposed below the disassembly platform 31, which is used to collect the residual adhesive scraped by the scraper 500.

Figure 4:
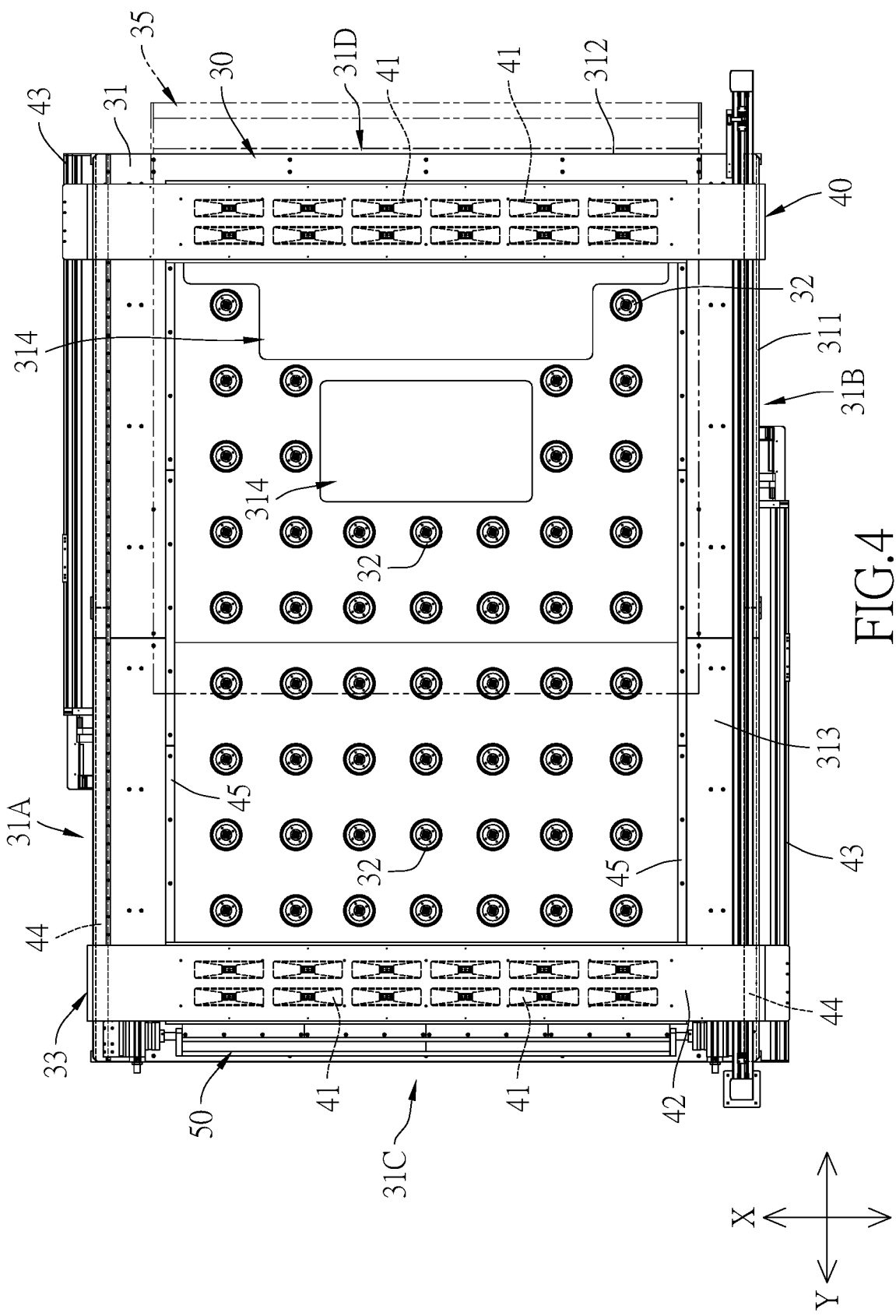
FIG. 4 is a top view of the stack material disassembly system.

Preferably, please refer to FIG. 4, the disassembly platform 31 also has at least one chip groove 314, which is connected with the collection groove 35, so that the EVA adhesive scraped by the scraper 500 will be pushed to the chip groove 314, and fall from the chip groove 314 into the collection groove 35 to achieve the effect of chip collection.

Preferably, please refer to FIG. 4, the number of the chip grooves 314 is plural, these chip grooves 314 are arranged along the transverse direction Y in parallel rows, the chip grooves 314 closer to the second end 31D are larger than those 314 farther away from the second end 31D, so that the EVA adhesive after scraping by the scraper 500 will be discharged in sequence from the smaller chip grooves 314, and the EVA adhesive that has not yet been discharged will be discharged from the larger chip grooves 314, which can avoid the occurrence of adhesive accumulation and extrusion. Preferably, a collection table is provided adjacent to the stack material disassembly system 30 and provided to accommodate glass, wafer, backplane, etc. generated after disassembly performed by the stack material disassembly system 30.

The above is the configuration description of the main components of the embodiments of the invention, and the operation mode and efficacy of the invention are described as follows.

First, the clamps 13 are pre-positioned at an origin position O on the frame disassembly system 10. When the handling device 20 moves the solar panel P to the frame disassembly system 10, the clamps 13 are moved together to the aluminum frame F of the solar panel P, and synchronically push outward to remove the aluminum frame F of the solar panel P, forming the stack material M. The stack material M is then transported to the disassembly platform 31 of the stack material disassembly system 30 by the handling device 20. At this time, the clamps 13 return to the origin position O again, and the stack material M located on the disassembly platform 31 is sucked by the bottom sucker 32. The heating unit 41 is then driven by the moving frame 42 of the heating and temperature control module 40 to move to a position above the stack material M to repeatedly heat the stack material M, so that the EVA adhesive between the glass upper cover, wafer layer and backplane layer melts, and then the suckers 233 of the handling device 20 absorb and remove the topmost material (such as the glass upper cover), make the removed glass top covers stacked on the collection table to facilitate sorting and recycling.

After the topmost material is removed, the scraper 500 is driven by the linear transmission mechanism 560 to remove the EVA adhesive above the second layer material (e.g. wafer layer), and the rotating mechanism 540 adjusts the downward pressure angle of the scraper 500. The downward pressure force is applied to unidirectionally scrape off the residual adhesive, and the scraped residual adhesive is pushed into the collection groove 35.

The heating unit 41 is driven to move again by the moving frame 42 of the heating and temperature control module 40, so as to heat the remaining stack material M. After the EVA adhesive between the wafer layer and the backplane layer melts and the viscosity decreases, remove the wires and the silicon wafers of the battery and collect them respectively, and then drive the scraper 500 to move through the linear transmission mechanism 560 to scrape the EVA adhesive above the third material layer (such as the backplane layer), and the rotating mechanism 540 adjusts the downward pressure angle of the scraper 500. The downward pressure force is applied to unidirectionally scrape off the residual adhesive, and the scraped residual adhesive is pushed into the collection groove 35, and finally the backplane layers are collected by the handling device 20 and stacked on the collection table for sorting and recycling.

From the above, it can be seen that the invention mainly disassembles the aluminum frame F of the solar panel P to form the stack material M through the frame disassembly system 10, and the stack material M is transported by the handling device 20 to the stack material disassembly system 30, and the stack material M is heated through the heating unit 41 to melt the EVA adhesive between the glass upper cover, wafer layer and backplane layer. Then the topmost material is removed through the suckers 233 of the handling device 20 to expose the residual adhesive, and the residual adhesive is scraped off by the scraper 500, so that each layer of material is repeatedly removed in sequence and collected and recycled respectively to achieve the purpose of high efficiency and environmental protection.

What is claimed is:

1. An automated dismantling and separation system for solar panels, comprising:
    a frame disassembly system including a carrying platform, a plurality of linear transmission devices disposed to the carrying platform, and a clamp disposed to each of the linear transmission devices;
    a stack material disassembly system including a disassembly platform, a heating and temperature control module, and a scraper module, wherein the heating and temperature control module includes at least one heating unit, at least one moving frame and at least one linear drive device, the at least one linear drive device drives the at least one moving frame to move, the at least one heating unit is disposed to the at least one moving frame, the scraper module includes a scraper and a linear transmission mechanism, and the scraper is disposed to and driven to move by the linear transmission mechanism; and
    a handling device provided for carrying solar panels to the frame disassembly system or carrying a stack material to the stack material disassembly system.

2. The automated dismantling and separation system for solar panels as claimed in claim 1, wherein the number of the linear transmission devices and the clamps is four, of which two linear transmission devices are oppositely arranged along a longitudinal direction, the clamps disposed to the two linear transmission devices are movable along the longitudinal direction, the other two linear transmission devices are oppositely disposed along a transverse direction, the clamps disposed to the other two linear transmission devices are movable along the transverse direction.

3. The automated dismantling and separation system for solar panels as claimed in claim 1, wherein the clamps each include a bottom, a diagonal guide portion, and a support portion, the bottom is disposed to a corresponding one of the linear transmission devices, the diagonal guide portion is located on a surface of the bottom opposite the one thereof disposed to the linear transmission device, and the support portion and the bottom are spaced by a distance to form a hook space.

4. The automated dismantling and separation system for solar panels as claimed in claim 3 further comprising a plurality of sensing devices, which are respectively disposed to the support portions of the clamps.

5. The automated dismantling and separation system for solar panels as claimed in claim 3, wherein the diagonal guide portion includes a guide slope, which is provided for leaning against the solar panels.

6. The automated dismantling and separation system for solar panels as claimed in claim 1, wherein the disassembly platform includes a first side and a second side oppositely arranged along the transverse direction, the number of the at least one heating unit is plural, the number of the at least one moving frame and the at least one linear drive device is two, there are also two guide rods, one of the linear drive devices is disposed to the first side of the disassembly platform, another linear drive device is disposed to the second side of the disassembly platform, one of the guide rods is disposed to the first side of the disassembly platform, another guide rod is disposed to the second side of the disassembly platform, one end of the two moving frames is fixed on one of the linear drive devices, another end of the two moving frames is movably disposed to one of the guide rods, and the number of the heating units on the two moving frames is plural.

7. The automated dismantling and separation system for solar panels as claimed in claim 1 further comprising a collection table located adjacent to the stack material disassembly system.

8. The automated dismantling and separation system for solar panels as claimed in claim 1, wherein the handling device includes a main frame, which is equipped with a plurality of rollers and a sucker module, the sucker module includes a sucker drive device, a sucker support, and a plurality of suckers, the sucker drive device is disposed to the main frame, the sucker support is disposed to the sucker drive device, and the suckers are disposed to the sucker support.

9. The automated dismantling and separation system for solar panels as claimed in claim 8, wherein the sucker support includes a slide rail to enable the suckers to move along the sucker support.

10. The automated dismantling and separation system for solar panels as claimed in claim 1, wherein the stack material disassembly system includes a plurality of bottom suckers, the disassembly platform includes a table, and the bottom suckers are disposed to the table.

11. The automated dismantling and separation system for solar panels as claimed in claim 1, wherein a collection groove is disposed below the disassembly platform for collecting residual adhesive scraped by the scraper, the disassembly platform further includes a plurality of chip grooves, and the chip grooves are arranged in parallel rows.

12. The automated dismantling and separation system for solar panels as claimed in claim 1, wherein two opposite sides of the disassembly platform are a first side and a second side, the moving frame includes two side plates and a top plate, the two side plates are connected to opposite two ends of the top plate respectively, the two side plates and the top plate collectively define a thermal space, the two side plates are located at the first side and the second side respectively, the heating unit is disposed to the top plate of the moving frame and located in the thermal space.

13. The automated dismantling and separation system for solar panels as claimed in claim 12, wherein one side of the top plate includes a baffle plate.

14. The automated dismantling and separation system for solar panels as claimed in claim 12 further comprises two heat barrier walls arranged at the first side and the second side respectively, the two heat barrier walls extend along a transverse direction, and a width of the two side plates along the transverse direction is less than a width of the two heat barrier walls along the transverse direction.

15. The automated dismantling and separation system for solar panels as claimed in claim 14, wherein the two heat barrier walls are hollow structures, and each have an inner space, the surfaces of the two heat barrier walls facing each other each are an inner surface, the surfaces of the two heat barrier walls facing away from each other each are an outer surface, the inner surface of each of the two heat barrier walls is equipped with a filter screen, the filter screens each have a plurality of holes, the holes of the filter screens are in communication with the inner space, the two heat barrier walls are connected with at least one end of a vent pipe, the other end of the vent pipe is connected with an air extraction motor, and the air extraction motor is provided for sucking air.

16. The automated dismantling and separation system for solar panels as claimed in claim 14, wherein the scraper is configured to scrape off an adhesive layer, the scraper includes:
   a body having a space;
   a blade connected to the body and including a tip;
   a reeling member disposed to the body and located in the space, wherein the reeling member is an arc-shaped sheet, one end of the reeling member is a first arc end, and the first arc end is abutted against the adhesive layer.

17. The automated dismantling and separation system for solar panels as claimed in claim 16, wherein the body includes two lateral walls, a rear wall and a bottom wall are connected between the two lateral walls, the rear wall and the bottom wall have one end connected with each other, the two lateral walls each include a front end and a rear end opposite to each other, the rear wall is connected to the rear ends of the two lateral walls, the two lateral walls each further include a top end and a bottom end opposite to each other, the bottom wall is connected to the bottom ends of the two lateral walls, the two lateral walls, the rear wall and the bottom wall collectively define a space, and the blade is connected to one end of the bottom wall that is not connected to the rear wall.

18. The automated dismantling and separation system for solar panels as claimed in claim 17, wherein the blade is connected to one end of the bottom wall that is not connected to the rear wall, the bottom wall includes a step groove at the top surface, and the first arc end of the reeling member is located in the step groove.

19. The automated dismantling and separation system for solar panels as claimed in claim 16 further comprising:
   two rotating mechanisms arranged on two opposite sides of the body, respectively, and configured to drive the body to rotate; and
   a power mechanism connected with the two rotating mechanisms to drive the two rotating mechanisms and the scraper to rotate.

20. The automated dismantling and separation system for solar panels as claimed in claim 1, wherein the disassembly platform includes a table, and two heat barriers are disposed to and protrude from the table.

* * * * *